(12) United States Patent
Ueda

(10) Patent No.: US 6,947,166 B2
(45) Date of Patent: Sep. 20, 2005

(54) IMAGE INPUT-OUTPUT APPARATUS AND METHOD THEREFOR

(75) Inventor: Shigeru Ueda, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 09/985,710

(22) Filed: Nov. 6, 2001

(65) Prior Publication Data

US 2002/0039188 A1 Apr. 4, 2002

Related U.S. Application Data

(62) Division of application No. 09/179,084, filed on Oct. 27, 1998, now Pat. No. 6,407,822.

(30) Foreign Application Priority Data

Oct. 28, 1997 (JP) .............................................. 9-295930

(51) Int. Cl.[7] .............................................. G06K 15/00
(52) U.S. Cl. ...................... 358/1.16; 358/1.14; 358/1.13
(58) Field of Search .............................. 358/1.15, 1.14, 358/1.13, 1.6, 400, 401, 1.2, 1.9, 3.23, 1.16, 1.17, 501, 502, 503, 506, 474, 513, 471, 472

(56) References Cited

U.S. PATENT DOCUMENTS

| 4,725,158 | A | * | 2/1988 | Ueda ........................... 400/63 |
| 4,731,672 | A | | 3/1988 | Sugishima et al. ......... 358/296 |
| 4,791,492 | A | * | 12/1988 | Nagashima .................. 358/256 |
| 5,666,215 | A | | 9/1997 | Fredlund et al. |
| 5,668,637 | A | | 9/1997 | Yamaguchi ................. 358/296 |
| 6,407,822 | B1 | * | 6/2002 | Ueda .......................... 358/1.15 |

FOREIGN PATENT DOCUMENTS

| JP | 08-293955 A | 11/1996 |
| JP | 08-321910 A | 12/1996 |
| JP | 09-037070 A | 2/1997 |

* cited by examiner

Primary Examiner—Jerome Grant, II
(74) Attorney, Agent, or Firm—Fitzpatrick, Cella, Harper & Scinto

(57) ABSTRACT

An image input-output apparatus is provided with a printing function for printing an image specified by print data from an external device and a reading function for reading an original image. The apparatus includes a printing function realizing unit, a discrimination unit, and a control unit. The printing function realizing unit operates in a first mode for realizing the printing function with a relatively small memory capacity and operates in a second mode for realizing the printing function with a relatively large memory capacity. The discrimination unit discriminates whether printing of the image specified by the print data is to be realized by the first mode or the second mode. If it is discriminated that printing is to be realized by the first mode, the control unit is adapted to allow parallel execution of the printing function and the reading function. Otherwise, parallel execution is inhibited.

16 Claims, 16 Drawing Sheets

FIG. 10

| | |
|---|---|
| 1301 | HEADER CODE (START) |
| 1302 | LINE DRAWING COMMAND 1201→1202 |
| 1303 | LINE DRAWING COMMAND 1202→1203 |
| 1304 | LINE DRAWING COMMAND 1203→1204 |
| 1305 | LINE DRAWING COMMAND 1204→1201 |
| 1306 | CHR START ADDRESS DESIGNATION COMMAND |
| 1307 | CHR FONT TYPE DESIGNATION COMMAND |
| 1308 | CHR FONT SIZE DESIGNATION COMMAND |
| 1309 | CHR CODE FOR "山" (YAMA) |
| 1310 | CHR CODE FOR "田" (DA) |
| 1311 | CHR CODE FOR "太" (TA) |
| 1312 | CHR CODE FOR "郎" (RO) |
| 1313 | IMAGE START ADDRESS DESIGNATION COMMAND |
| 1314 | IMAGE X-WIDTH DESIGNATION COMMAND |
| 1315 | IMAGE DATA |
| | IMAGE DATA |
| | ⋮ |
| 1316 | FOOTER CODE (END) |

FIG. 11

| | | |
|---|---|---|
| 1401 | BAND 1221 START CODE | ⎫ FOR BAND 1221 |
| 1402 | LINE DRAWING COMMAND 1201→1202 | |
| 1403 | LINE DRAWING COMMAND 1202→1210 | |
| 1404 | LINE DRAWING COMMAND 1207→1201 | |
| 1405 | BAND 1221 END CODE | ⎭ |
| 1406 | BAND 1222 START CODE | ⎫ FOR BAND 1222 |
| 1407 | LINE DRAWING COMMAND 1210→1211 | |
| 1408 | LINE DRAWING COMMAND 1208→1207 | |
| 1409 | CHR START ADDRESS DESIGNATION COMMAND | |
| 1410 | CHR FONT TYPE DESIGNATION COMMAND | |
| 1411 | CHR FONT SIZE DESIGNATION COMMAND | |
| 1412 | COMMAND FOR DRAWING CHR CODE 1309 WITHIN BAND 1222 | |
| 1413 | COMMAND FOR DRAWING CHR CODE 1310 WITHIN BAND 1222 | |
| 1414 | COMMAND FOR DRAWING CHR CODE 1311 WITHIN BAND 1222 | |
| 1415 | COMMAND FOR DRAWING CHR CODE 1312 WITHIN BAND 1222 | |
| 1416 | BAND 1222 END CODE | ⎭ |
| 1417 | BAND 1223 START CODE | ⎫ FOR BAND 1223 |
| 1418 | LINE DRAWING COMMAND 1211→1212 | |
| 1419 | LINE DRAWING COMMAND 1209→1208 | |
| 1420 | CHR START ADDRESS DESIGNATION COMMAND | |
| 1421 | CHR FONT TYPE DESIGNATION COMMAND | |
| 1422 | CHR FONT SIZE DESIGNATION COMMAND | |
| 1423 | COMMAND FOR DRAWING CHR CODE 1309 WITHIN BAND 1223 | |
| 1424 | COMMAND FOR DRAWING CHR CODE 1310 WITHIN BAND 1223 | |
| 1425 | COMMAND FOR DRAWING CHR CODE 1311 WITHIN BAND 1223 | |
| 1426 | COMMAND FOR DRAWING CHR CODE 1312 WITHIN BAND 1223 | |
| 1427 | IMAGE START ADDRESS DESIGNATON COMMAND | |
| 1428 | IMAGE X-WIDTH DESIGNATION COMMAND | |
| 1429 IMAGE DATA (WITHIN BAND 1223) | ⋮ | |
| 1430 | BAND 1223 END CODE | ⎭ |
| | ⋮ | |

IMAGE INPUT-OUTPUT APPARATUS AND METHOD THEREFOR

This application is a division of application Ser. No. 09/179,084, filed on Oct. 27, 1998 now U.S. Pat. No. 6,407,822.

BACKGROUND OF THE INVENTION

1. Field of the Invention

The present invention relates to an image input-output apparatus having operation modes such as copying, printing, image reading etc. and a method therefor.

2. Related Background Art

The image input-output apparatus having such plural functions, generally called multi-function printer or multi-function copier (registered trade mark), can be classified into the following two categories.

1) A first type is so constructed as to execute as many functions as possible at the same time. An example of the configuration of the first type shown in FIG. 16.

Referring to FIG. 16, there are provided an image input unit 701; an operation panel 702 for entering various commands; an image processor unit 703 for applying predetermined image processing on the image read by the image input unit 701 in order to enable printing by a printer engine unit 709; an operation panel interface (I/F) 704; a main controller unit 705 for controlling the entire apparatus according to a control program stored in a ROM 707; a network I/F 706 for connection with a network; a ROM 707; RAM's 708, 712 used for example as a work memory; and printer engine 709, and a printer engine I/F 711.

Such apparatus is divided, as shown in FIG. 16, in a section 700 including the image input unit 701, the printer engine 709, the RAM 712, the image processor 703 and a CPU 705a and principally realizing the function of the digital copying apparatus, and a section 721 including a memory composed of the ROM 107 and the RAM 708, the network I/F 706 and a CPU 705b and effecting, in the CPU 705b, conversion of the document data transmitted through the network I/F 706 into a dot pattern printable by the printer engine 709.

For this reason, as shown in FIG. 16, there are provided completely separate two RAM's 707, 712 as the data work memories.

2) A second type is designed for a reduced cost, realizing multiple functions at a cost as low as possible and sacrificing the simultaneous functions in the first type.

However, the configuration as shown in FIG. 16 is inevitably associated with a considerably high cost, because of the necessity of the separate memories mentioned above. For example there is at least a memory capacity of 8.5 Mbytes, including 4 Mbytes for storing the image data entered by a scanner, in binary data of A4 size at 600 dpi, 4 Mbytes for a bit map memory for printing with a full bit map in binary data of A4 size at 600 dpi, and 0.5 Mbytes for a page memory before development into the bit map memory.

SUMMARY OF THE INVENTION

The present invention is to solve the above-mentioned limitation in the prior art, and such object can be attained by the following configuration.

An image input-output apparatus of the present invention is featured by:

reader means for reading an original on an original table; memory means for storing image information; communication means for effecting communication with another information processing apparatus through a communication medium; printer means for printing image data; and control means for selectively executing a copy mode for printing the image data, read by the reader means, by the printer means or a print mode for printing the image data, stored in the memory means, by the printer means or a reading mode for storing the image data, read by the reader means, in the memory means, wherein the control means is adapted, in the copy mode, to directly transmit the image data from the reader means to the printer means by mutually synchronizing the reading operation of the reader means with the printing operation of the printer means, and, in the print mode or the reading mode, to made access to the memory means according to the function of the printer means or the reader means.

The apparatus is also featured, for example, in that the control means operates the printer means in the above-mentioned print mode with the highest priority and the copy mode with the next priority.

The apparatus is also featured, for example, in that the printer means is provided two output locations for the print output and, in case of a request for the copy mode operation in the course of a print mode operation, the control means is adapted to execute such copy mode operation by interrupting the print mode operation in case there is a vacancy in the print output locations of the printer means, and the printer means outputs the print of the copy mode operation in such print output location.

The apparatus is also featured, for example, in that, in case of a request for the copy mode operation in the course of a print mode operation, the control means is adapted to execute such copy mode operation after the completion of the print mode operation in case there is no vacancy in the print output locations of the printer means.

The apparatus is also featured in that the memory means includes an image data memory area for storing the image read by the reader means and a print data memory area for storing the print output image of the printer means, and the memory capacity of such print data memory area does not exceed the image of a page of the printer means.

The apparatus is also featured, for example, in that, in case of printing, by the printer means, print data received from the other information processing apparatus through the communication means, the control means is adapted, in printing the print data stored in the print data memory area of the memory means, if the data storage in the print data memory area is not possible because the data storage of the data received from the communication means into the memory means is faster than the printing operation of the print data and if a vacancy is available in the image data memory area, to assign a part of the image data memory area for the print data memory area.

BRIEF DESCRIPTION OF THE DRAWINGS

FIG. 10 is a view showing an example of data structure of the document information shown in FIGS. 9A and 9B;

FIG. 11 is a view showing the data structure of the intermediate codes, corresponding to the document information shown in FIG. 10;

DESCRIPTION OF THE PREFERRED EMBODIMENTS

Figure 1:
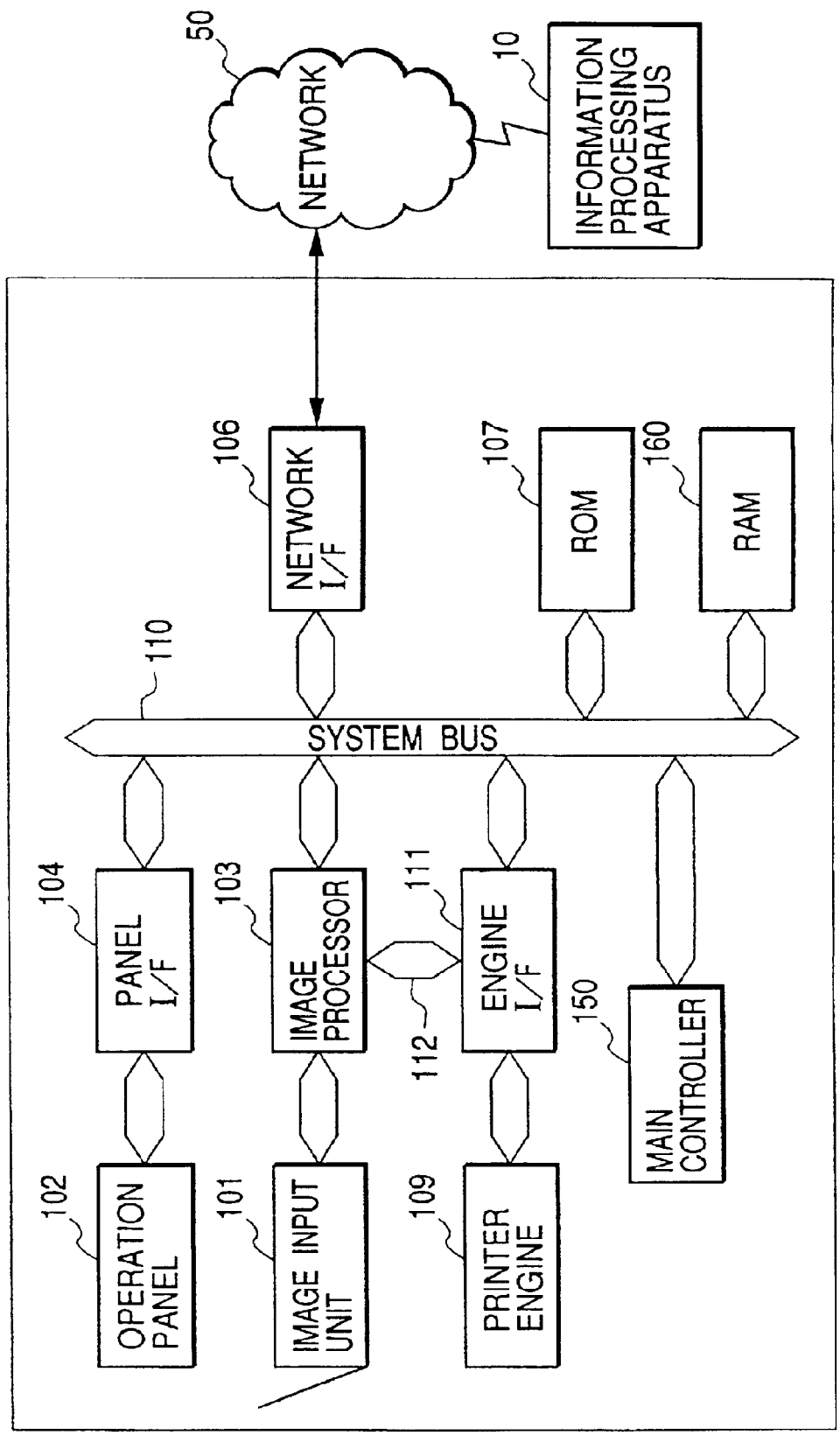
FIG. 1 is a block diagram showing the configuration of a multi function printer constituting an embodiment of the present invention.
Figure 16:
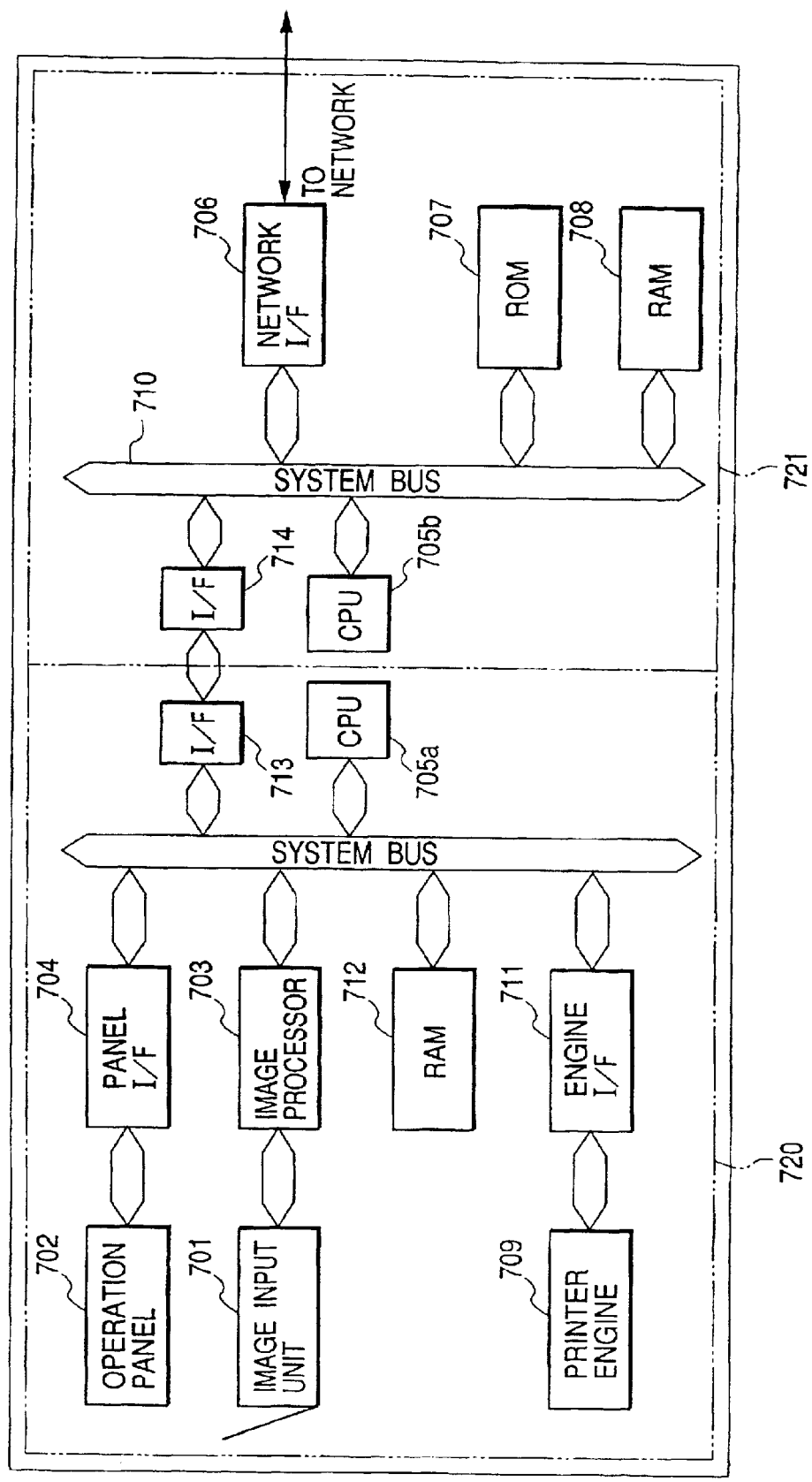
FIG. 16 is a block diagram showing the configuration of a multi function printer.

Now the present invention will be clarified in detail by a preferred embodiment thereof, with reference to the attached drawings. FIG. 1 is a block diagram showing the configuration of a multi function printer (hereinafter abbreviated as MFP) which constitutes an image input-output apparatus embodying the present invention, and FIG. 2 is an external view of the MFP of the above-mentioned embodiment, wherein components equivalent to those in FIG. 16 are represented by corresponding numbers.

Figure 2:
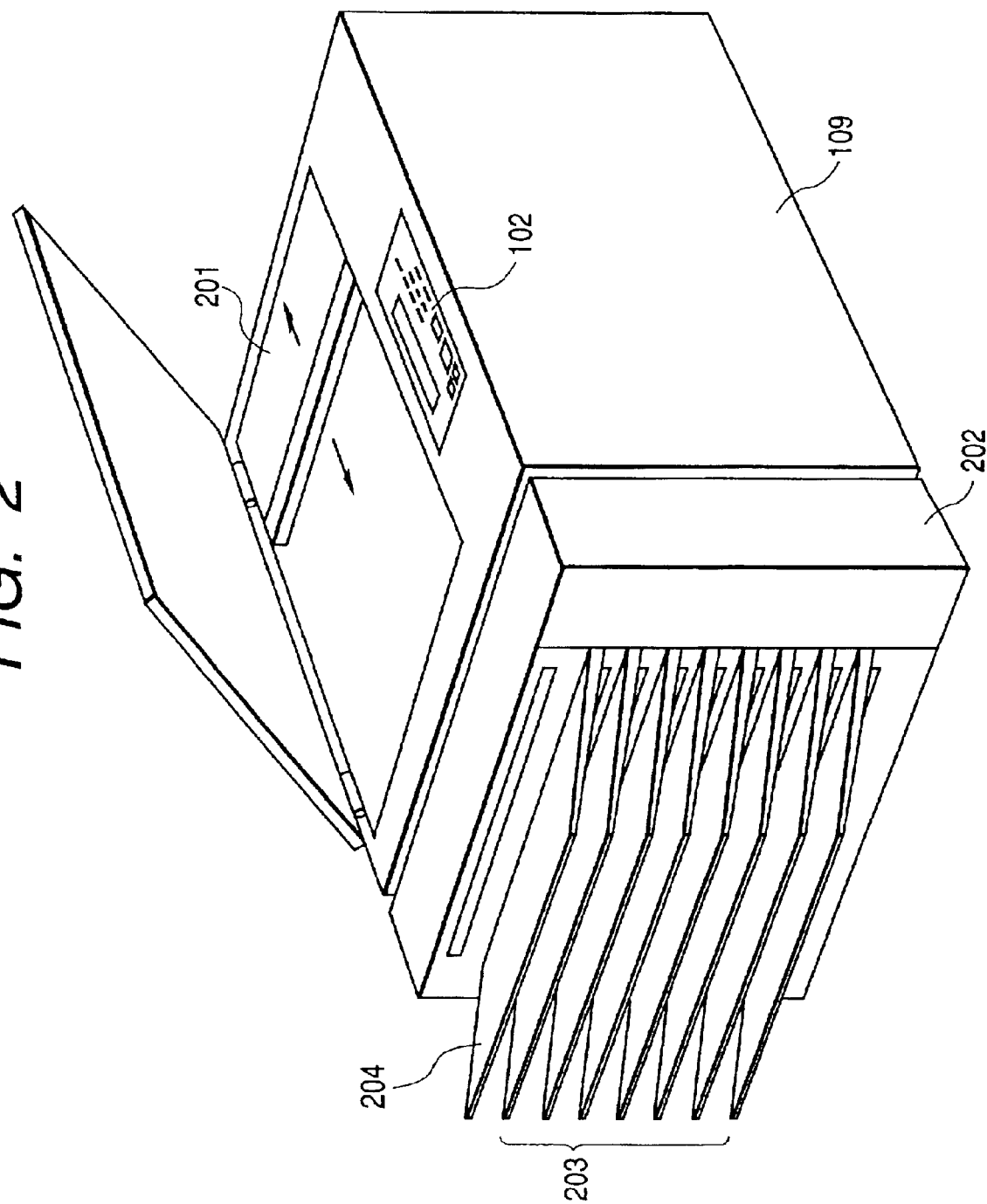
FIG. 2 is an external view of the multi function printer embodying the present invention.

In FIG. 1, there are shown an image input unit 101 for scanning an original placed on an original table shown in FIG. 2 thereby obtaining image data; an operation panel 102 for entering various commands; and an image processor unit 103 for effecting image processing on the entered image data for enabling the printing operation in a printer engine unit 109 or conversion into a form required by an information processing apparatus (host computer) 10 connected to a network 50.

There are also shown an operation panel I/F 104; a network I/F 106 for controlling communication with another information processing apparatus 10 etc. connected through the network 50; a ROM 107 storing an operation program etc. for use by a main controller unit 105; a printer engine 109 such as a laser beam printer, having so-called page printing function for printing in the unit of a page; a system bus 110; and a printer engine I/F 111.

A main controller 150 controls the entire MFP according to a control program stored in the ROM 107, and is composed for example of a CPU. A RAM 170 serves to store the image data processed in the image processor 103 and the text data to be printed by the printer engine 109.

Referring to FIG. 2, there are shown an original table 201 for placing the original to be entered as the image; an operation panel 102; a printer engine 109 for printing image data entered from the original table or document data (described in a printer language such as PCL or PS) transmitted from the host computer such as the information processing apparatus 10; a sorter unit 202 for accepting and sorting the sheets printed in the printer engine; bins 203, consisting of 7 bins in the present embodiment, in which the printed sheets are discharged in a sorter-on mode; and a sheet discharge unit 204 in which the printed sheets are discharged in a sorter-off mode. In each of the bins 203 there is provided a sensor for detecting whether a printed sheet remains therein.

Figure 3:
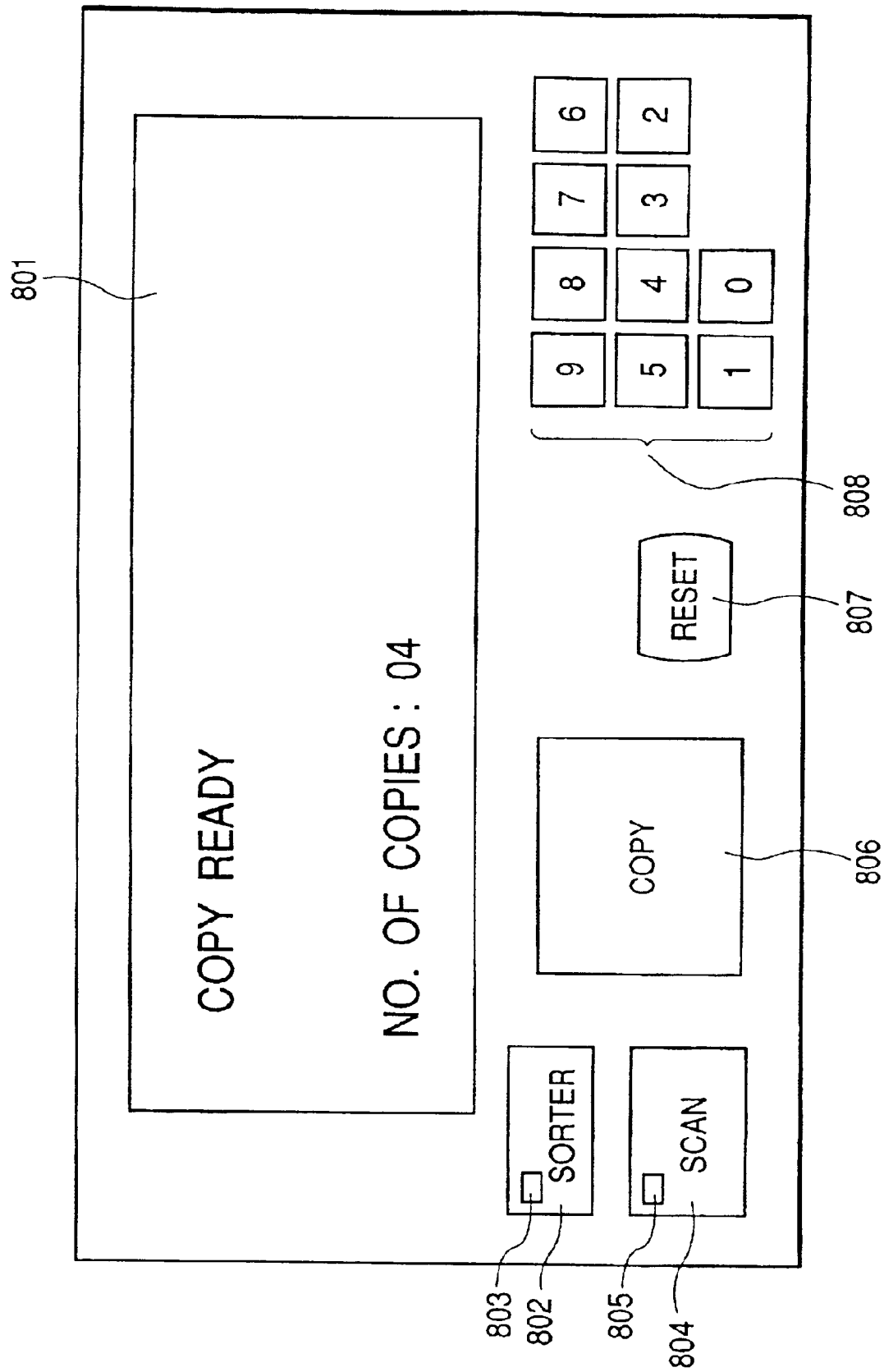
FIG. 3 is a view showing an operation panel of the multi function printer embodying the present invention.

The details of the operation panel 102 shown in FIGS. 1 and 2 will be explained with reference to FIG. 3, showing the configuration of the operation panel 102. In FIG. 3, there are shown a display unit 801, a sorter switch 802 for designating on/off state of the sorter 202 in the copy mode operation, and an LED 803 to be turned on when the sorter 202 is activated.

A scan switch 804 to be actuated, in case of image reading from the image input unit 101, when the original to be entered is set on the original table 201 and the preparation for the image reading is completed and the image input command for example from the information processing apparatus can be properly responded. An LED 805 is turned on when the scan switch 804 is actuated, and is turned off when the image input process is completed.

There are also provided a copy start switch 806 for instructing the start of operation in the copy mode; a reset switch 807; and numeral keys 808 for designating the number of copies.

In the following there will be explained the function of the above-described MFP embodying the present invention.

[Function in the Print Mode]

In the print mode, the document data transmitted from the information processing apparatus 10 through the network 50 and the network I/F 106 are once stored in the RAM 160 and are then printed in the printer engine 109.

The functions of the present embodiment in the print mode will be explained with reference to FIGS. 4 to 6, which are flow charts showing the functions of the print mode.

When the data are transmitted from the information processing apparatus 10 through the network, the main processor 106 shifts to the process shown in FIGS. 4 to 7. At first a step S1 in FIG. 4 discriminates whether the received data is a scan start command, and, if not, a step S2 discriminates whether the received data are an inquiry command. If an inquiry command from the information processing apparatus (host) 10 is identified, the sequence proceeds to a step S3 for returning a status, responding to the inquiry, to the information processing apparatus 10 through the network I/F 106.

On the other hand, if the step S2 identifies that the received data are not an inquiry command from the information processing apparatus 10, a step S4 discriminates whether the data received from the information processing apparatus 10 are document data. If the received data are not document data, a message "data input error" is displayed on the display unit 801 of the operation panel 102 and the sequence is terminated.

If the step S4 identifies that the received data are document data from the information processing apparatus 10, the sequence proceeds to a step S6 for storing the received document data in the page memory area of the RAM 160. Then a step S7 discriminates whether the document data of a page have been received and stored in the page memory area 1101 of the RAM 160, and, if not, the process is terminated without executing a step S8 and subsequent process, in order to wait for the entry of the ensuing document data. This operation is to continue the entry and storage of the data into the RAM 160 until the end of document data of a page, because the printer engine 190 is composed of so-called page printer.

Figure 8:
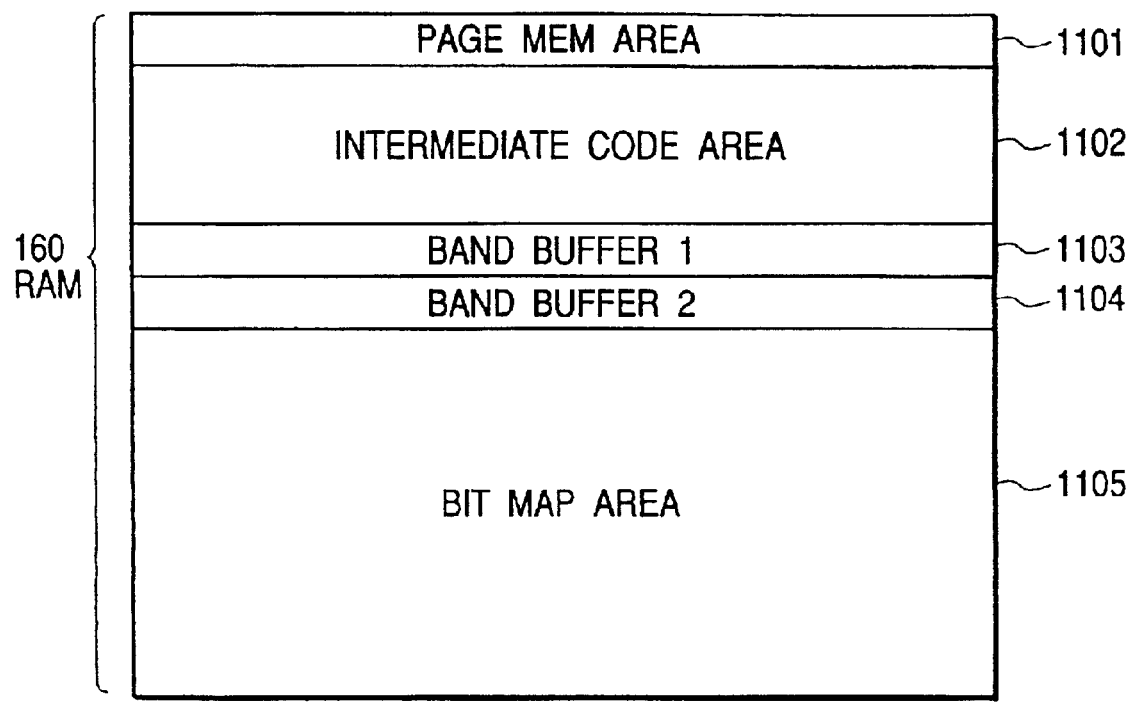
FIG. 8 is a view showing internal areas of a RAM in an embodiment of the present invention.

In the present embodiment, the RAM 160 has a configuration shown in FIG. 8, including a page memory area 1101 for storing document data, an intermediate code area 1102, a band buffer 1 area 1103, a band buffer 2 area 1104, and a bit map area 1105 for storing the print image in the print engine 109.

The document data transmitted from the information processing apparatus 10 are prepared in the unit of a page. In contrast, the intermediate code employed in the present embodiment means codes converted into a form that can be processed in the unit of a band, in order that such document data can be handled in a band memory of a capacity smaller than that of the bit map memory for a page.

The received document data are stored in succession in the page memory area 1101, and, upon storage of the document data of a page, the sequence proceeds from the step S7 to S8 for preparing intermediate codes and storing them in the intermediate code area 1102 of the RAM 160.

Figure 9A:
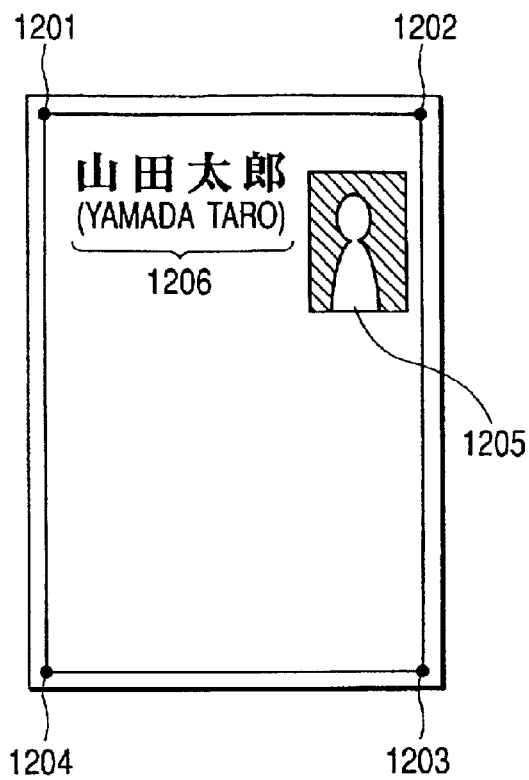
FIGS. 9A and 9B are views showing an operation of converting document data of a page unit into intermediate codes of a band unit, in an embodiment of the present invention.
Figure 9B:
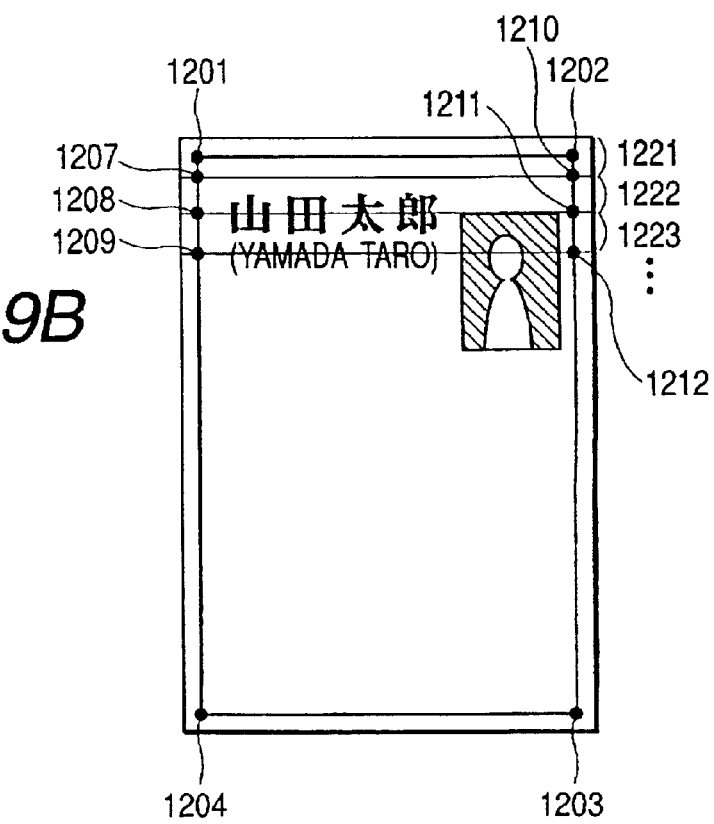

FIGS. 9A and 9B show the operation of converting the document data in the unit of a page, transmitted from the information processing apparatus 10, into the intermediate codes in the unit of a band.

In FIG. 9A, 1201–1204 indicates data of target points for straight line drawing, and the illustrated straight lines can be printed by drawing these target point data 1201–1204. There are also shown image data 1205 and character data 1206. The character data 1206 show an example of input "山田 太郎" (YAMADA TARO). In FIG. 9B, 1221–1223 indicate a band area to be drawn.

FIG. 10 shows an example of the data structure of the document information shown in FIGS. 9A and 9B, wherein the document information is substantially constituted from a header code 1301 to a footer code 1316.

1302–1305 are ling drawing commands, in which the command 1302 is to draw a line connecting the target point data 1201 and 1202, the command 1303 is to draw a line connecting the target point data 1202 and 1203, the command 1304 is to draw a line connecting the target point data 1203 and 1204, and the command 1305 is to draw a line connecting the target point data 1204 and 1201.

A character start address designation command 1306 designates the print address of the character data 1206 shown in FIGS. 9A and 9B. A command 1307 designates the kind of the character font, printable in the printer engine 109 of the present embodiment. A command 1308 designates the size of the character font.

1309–1312 indicate character codes, corresponding to the character data 1206 shown in FIGS. 9A and 9B. An image start address designation command 1313 designates the print start address of the image data 1205 shown in FIGS. 9A and 9B. A command 1314 designates the width of the image in the x-direction. 1315 indicates image data, corresponding to the image 1205 shown in FIGS. 9A and 9B.

In the following there will be explained the banding method employed in the present embodiment.

If the memory for storing the bit image data to be printed by the printer engine 109 has a capacity of a page (ca. 4 Mbytes for A4 size in case of 600 dpi), the document data shown in FIG. 10 can be developed in succession into such bit map memory. In the present embodiment, however, in order to reduce the total memory capacity of the RAM 160, it has two band drawing command 1404 serves to draw a line connecting the target point data 1207 and 1201. A line drawing command 1407 serves to draw a line connecting the target point data 1210 and 1212.

A line drawing command 1419 serves to draw a line connecting the target point data 1209 and 1208. A character start address designation command 1409 serves to designate the print address of the above-mentioned character data 1206 in the band 1221.

A character font designation command 1410 designates the font printable by the printer engine 109, while a command 1411 designates the size of the character font. Band drawing commands 1412–1415 serve to draw the character codes 1309–1312 belonging to the band 1222.

A character start address designation command 1420 serves to designate the print address of the above-mentioned character data 1206 in the band 1223. A character font designation command 1421 designates the font printable by the printer engine 109, while a command 1422 designates the size of the character font. Band drawing commands 1423–1426 serve to draw the character codes 1309–1312 belonging to the band 1223.

An image start address designation command 1427 serves to draw the image data 1205 shown in FIGS. 9A and 9B in the band 1223. A command 1428 serves to designate the width, in the x-direction, of the image memories areas for example of 512 lines each (256 Kbytes at 600 dpi), which are used as so-called double buffers, and there is adopted a method of transmitting the bit image data from a band memory to the printer engine 109 while developing the dot data of a next band into the other band memory at the same time, and alternating the band memories in succession. Such method is however unable to cope with a drawing command involving plural bands, such as the line drawing command 1303 shown in FIG. 10.

In the present embodiment, therefore, there is executed an operation of converting the document data shown in FIG. 10 into intermediate codes of each band, and then developing such intermediate codes of each band into the bit image. FIG. 11 shows the data structure of the intermediate codes corresponding to the document data shown in FIG. 10.

Referring to FIG. 11, there are provided band start codes 1401, 1406, 1417 and band end codes 1405, 1416, 1430 to define bands 1221, 1222, 1223 in which various drawing commands are incorporated.

1402–1404, 1407, 1408, 1418 and 1419 are line drawing commands, in which a line drawing command 1402 serves to draw a line connecting the target point data 1201 and 1202.

A line drawing command 1403 serves to draw a line connecting the target point data 1202 and 1210. A line data 1205 shown in FIGS. 9A and 9B. 1429 indicates image data, corresponding to a portion of the image data to be drawn in the band 1233.

As shown in FIG. 11, for example the line drawing command 1303 involved in the bands 1221–1223 shown in FIG. 9B is replaced by the line drawing commands 1403, 1407, 1419 of the respective bands. Similarly the character and image information are divided into the respective bands.

The data amount of the intermediate codes converted from the document data as explained in the foregoing is generally larger than that of the document data transmitted from the information processing apparatus 10, and the amount of such increase depends on the complexity of the document data. As the present embodiment intends to realize an image input-output apparatus (MFP) having sufficient functions while minimizing the memory capacity of the RAM 160, the capacity of the intermediate code area is selected as 1 Mbyte while that of each of the two band buffer areas is selected as 256 Kbytes, whereby the total capacity of these three areas does not exceed 1.5 Mbytes.

In practice, the data amount per page of general text data is less than 100 Kbytes, an intermediate code area of 1 Mbyte allows to print most document data in the band memory format explained above.

Figure 4:
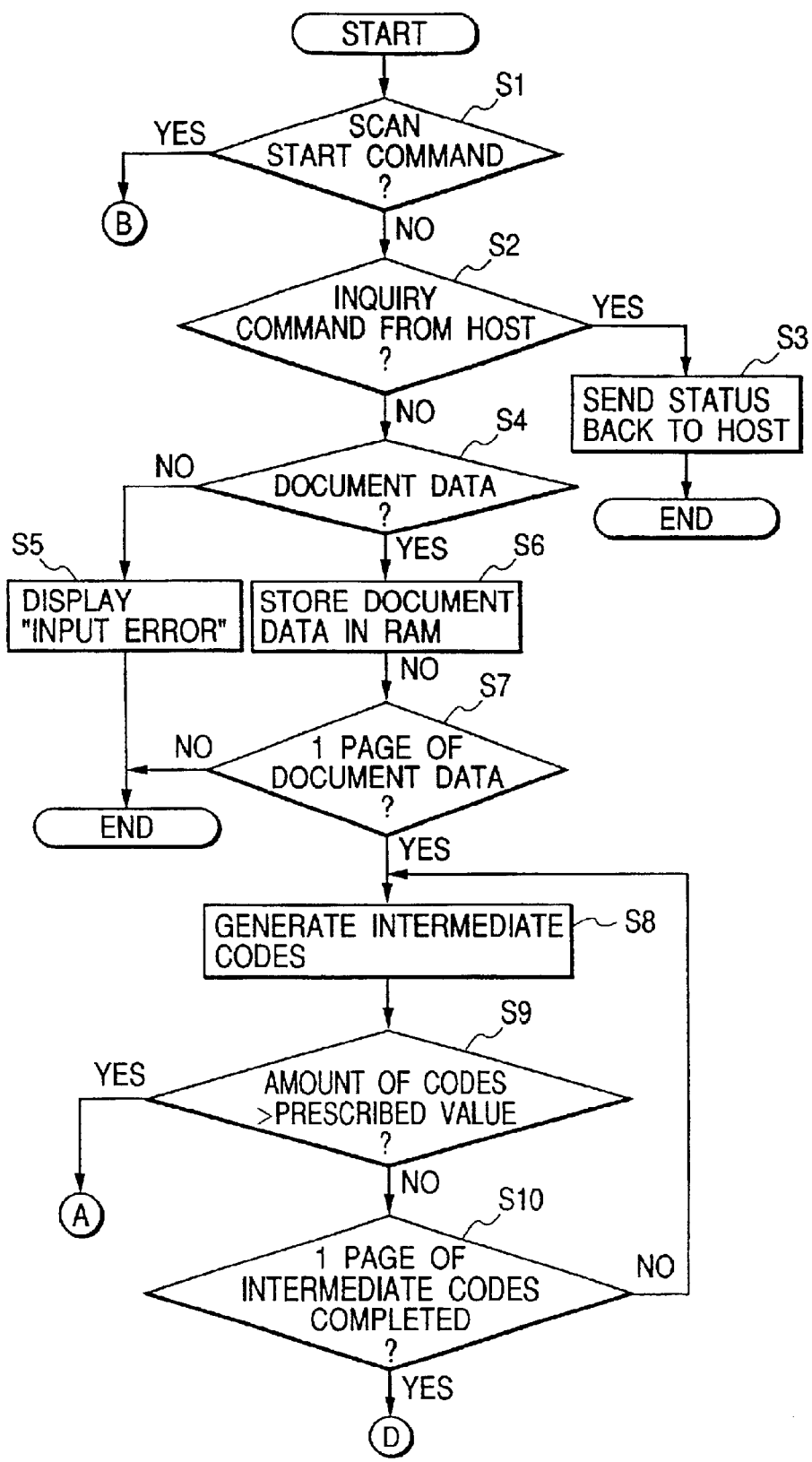
FIGS. 4, 5 and 6 are flow charts showing the functions in the print mode of an embodiment of the present invention.

Again referring to the flow chart shown in FIG. 4, in a step S8, the main controller 105 prepares the intermediate codes by the conversion of the document data, in the intermediate code area 1102 of the RAM 160. In a next step S9, the main controller 105 monitors whether the amount of the intermediate codes exceeds the capacity of the intermediate code area 1102, and, in case the capacity is not exceeded, the sequence proceeds to a step S10 for discriminating whether the preparation of the intermediate codes of, a page has been completed. If not completed, the sequence returns to the step S8 to continue the generation and storage of the intermediate codes in succession.

Figure 6:
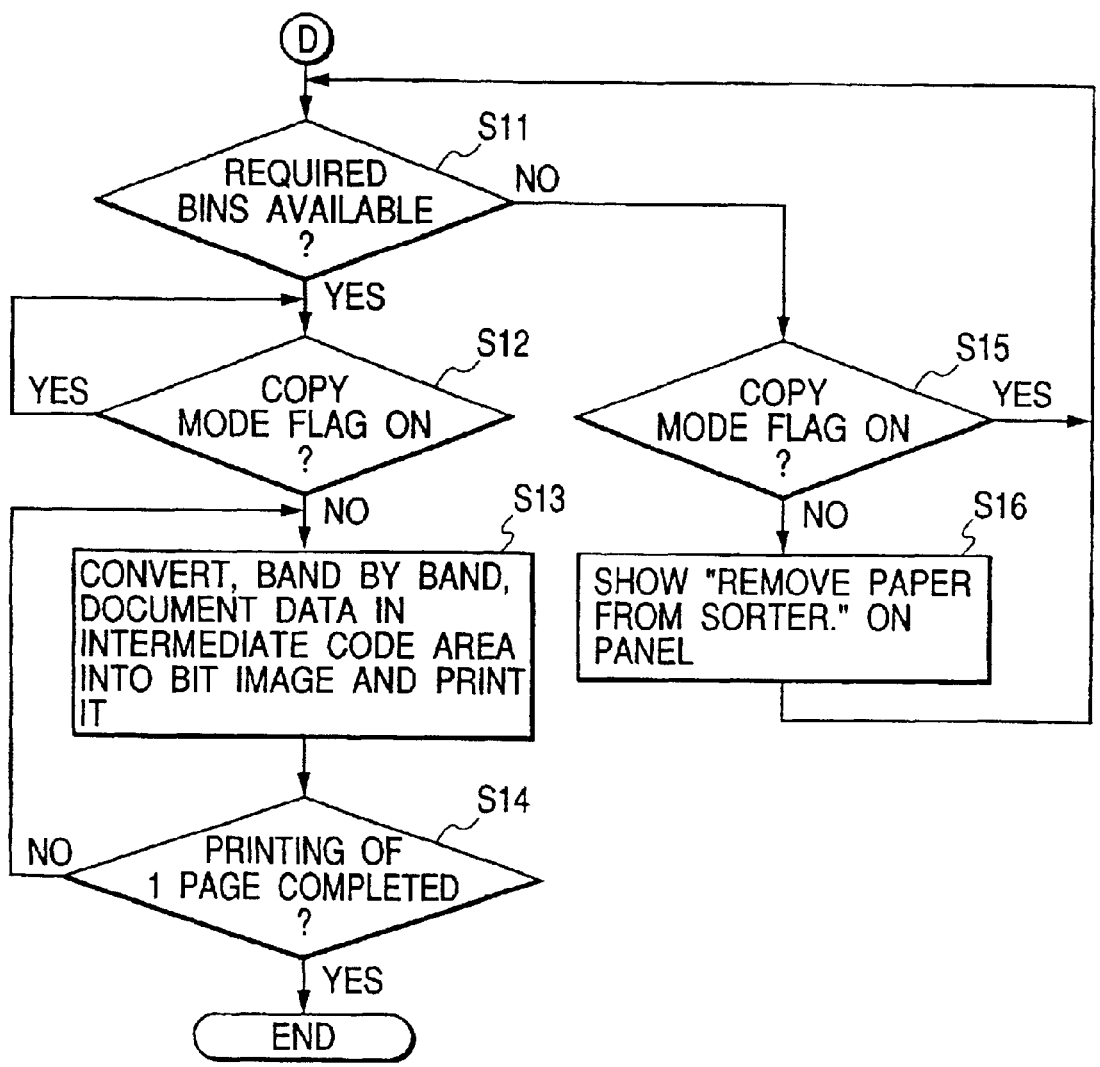

When the preparation of the intermediate codes of a page is completed through the above-described process, the sequence proceeds from the step S10 to a step S11 in FIG. 6, in which the main controller 105 discriminates whether the sheet discharge unit of the sorter 202 of the printer engine 109 has empty bins of a number required in printing the document data. The number of copies to be printed from the document data and whether the copies are to be sorted into the bins are transmitted at the start of the document data from the information processing apparatus 10.

Figure 5:
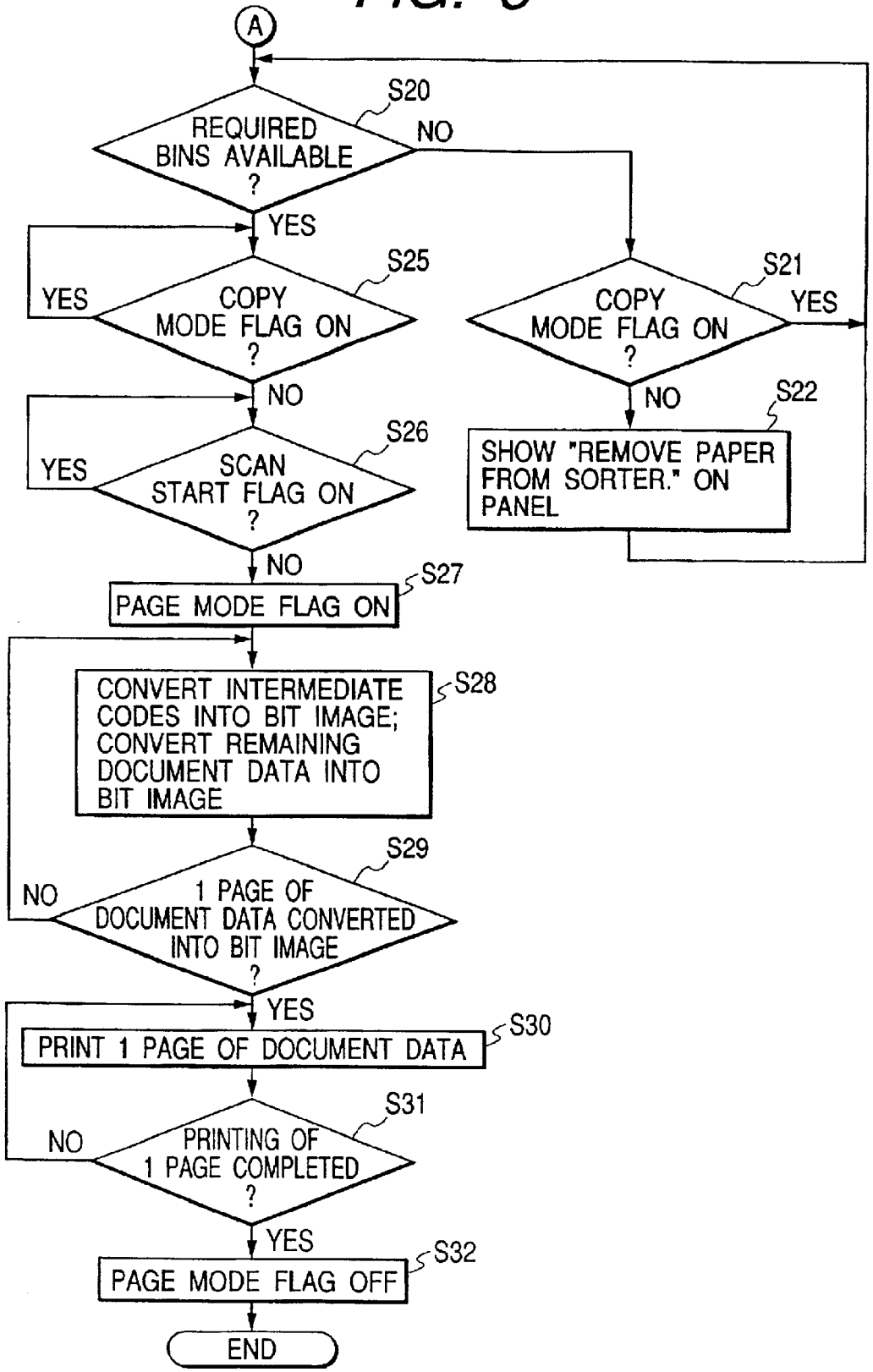

In FIG. 6, steps S11 and S12 are same as the steps S20 and S25 in FIG. 5, and steps S15 and S16 are same as the steps S21 and S22. Also steps S13 and S14 are executed according to the above-described banding method.

Figure 12:
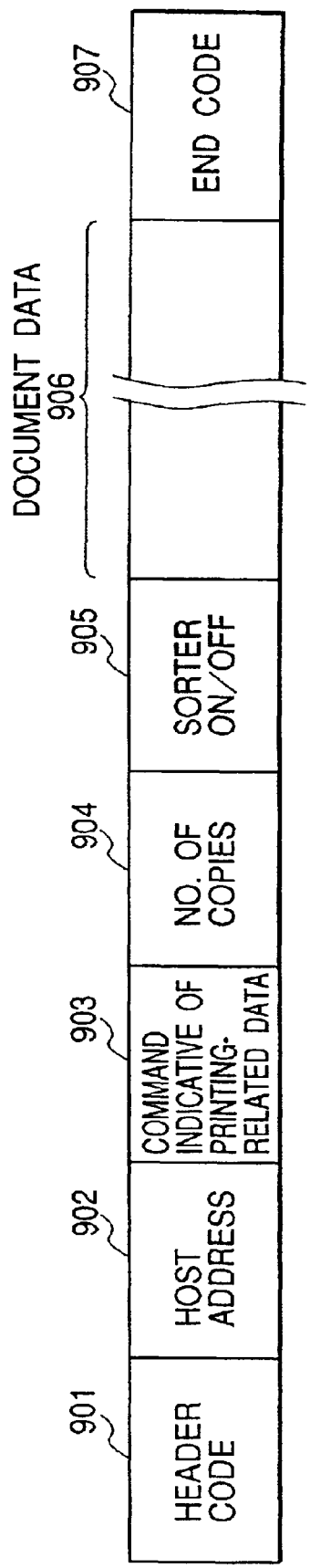
FIG. 12 is a view showing an example of the document data command from the information processing apparatus embodying the present invention.

FIG. 12 shows an example of the data transmitted from the information processing apparatus 10. In the following there will be explained, with reference to FIG. 12, the configuration of the data from the information processing apparatus 10. The data contains a header code 901, data 902 indicating the network address of the information processing apparatus 10 which transmits the data, a command 903 indicating that the following data are related to the printing of a document, data 904 indicating the number of printed copies of the following document data, data 905 indicating whether the sorter is used or not in the printing of the following document data, document data 906, and an end code 907.

For example, if the data 904 indicates printing of 5 copies and the data 905 designates the use of the sorter at printing, 5 bins of the sorter should be empty at the printing. If the data 905 select not to use the sorter, all the printed sheets are discharged to the sheet discharge unit 204.

Thus, if a step S20 identifies the use of the sorter but that the bins of the necessary number are not empty in the sorter at the printing, the sequence proceeds to a step S21 for discriminating whether a copy mode flag is on. If the copy mode flag is on, flag is turned on.

If the scan start flag is on, the bit map area of the RAM 160 contains stored image data. On the other hand, the off state of the scan start flag indicates that the bit map area 1105 is empty.

Thus, when the step S26 identifies that the scan start flag is turned on, the sequence proceeds to a step S27 to turn on a page mode flag, declaring the use of the bit map area 1105 for printing, and the sequence then proceeds to a step S28.

The step S28 stores the image data, entered from the image input unit 101 and processed in the image processor unit 103, in the bit map area 1105 of the RAM 160. A next step S29 discriminates whether the development into the bit map memory area 1105 has been completed, and, if not, the sequence returns to the step S28 for continuing the development.

The bit map area 1105 has a capacity of 4 Mbytes, capable of storing the binary bit image data of A4-sized original at 600 dpi. If the gradation of the original is to be emphasized, the area can store the A4-sized original in the data of 256 levels, at a resolution of 75 dpi (the amount of image data in this case being 2 Mbytes). Whether the emphasis is to be given to the resolution or the gradation is determined by a command from the information processing apparatus 10, as will be explained later in more details.

As explained in the foregoing, the bit map area 1105 has a capacity of 4 Mbytes, enough for storing the binary bit image data of an A4-sized original with a resolution of 600 dpi, so that the main controller 105 analyzes and converts the intermediate codes of the intermediate code area into a bit image, developed directly in the bit map area 1105. Also the remaining document data of the same page, in the page memory area, are directly converted, without conversion into the intermediate data, into the bit image, developed in the bit map area 1105.

A next step S29 discriminates whether the development of the document data of a page into the bit image has been completed, and, if not, the sequence returns to the step S28 to continue the development of the document data of a page into the bit image.

If the step S29 identifies that the development of the document data of a page into the bit image has been completed, the sequence proceeds to a step S30, in which the main controller 105 reads the bit image from the bit map area 1105 and sends the bit image in succession to the printer engine 109 through the printer I/F 111, thereby executing printing. A next step S31 discriminates whether the printing output of a page has been completed, and, if not, the sequence returns to the step S30 to continue the printing operation.

If the step S31 identifies that the printing of a page has been completed, the sequence proceeds to a step S32 to turn off the page mode flag, whereupon the process of the print mode is terminated. Consequently, in this case, the printing operation can be executed without hindrance, if the image input operation is not encountered.

[Function in the Read Mode]

In the read mode, an image is entered from the image input unit 101 and is transmitted to the information processing apparatus 10. The process in this case is started by placing an original to be inputted is placed on the original table 201 and by depressing the scan button 804 of the operation panel 102. In the following, prior to the explanation of the function in the read mode, the functions of the main controller 150 caused by the operations on the operation panel 102 of the present embodiment will be outlined with reference to FIG. 13.

Figure 13:
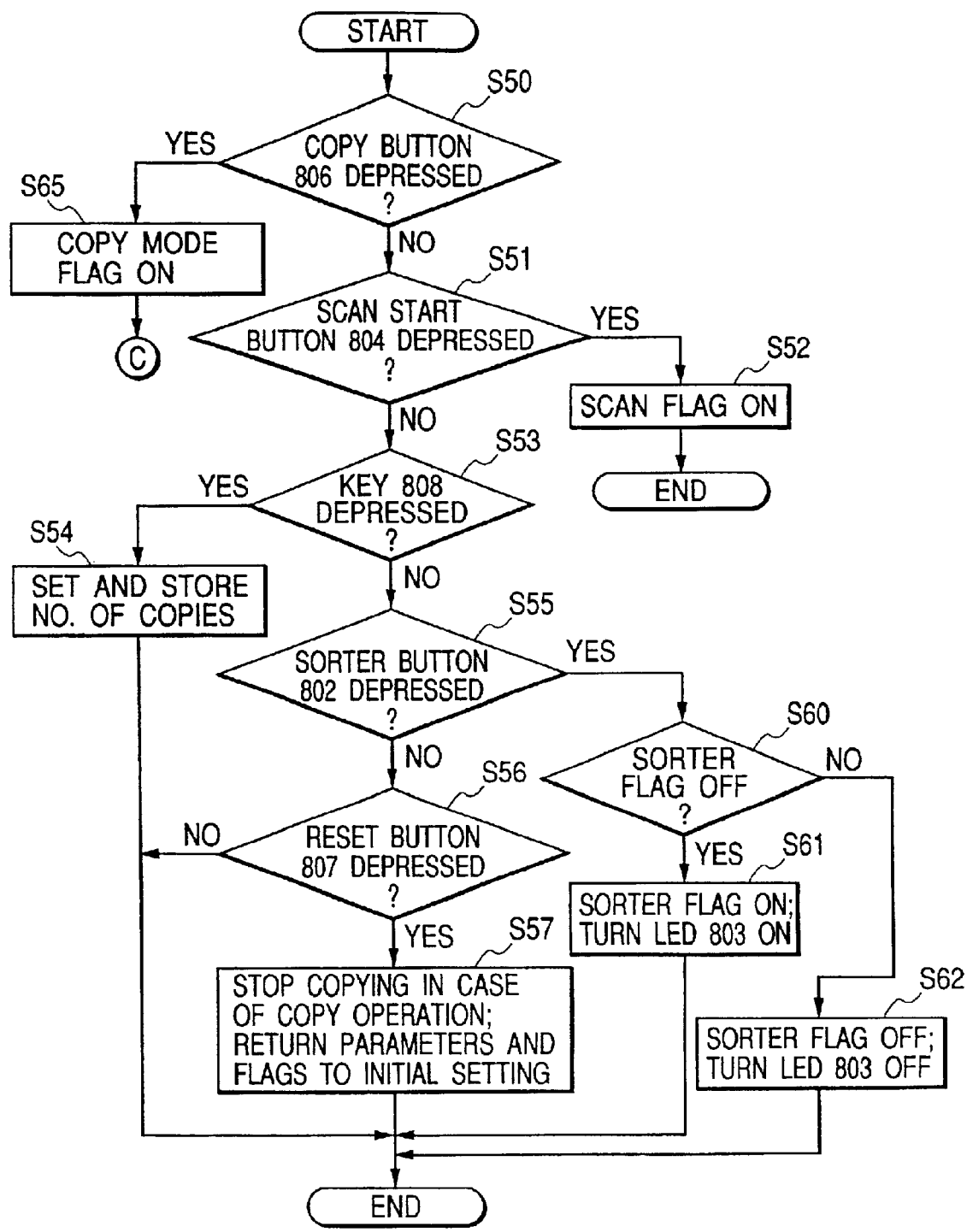
FIGS. 13 and 14 are flow charts showing the functions in the copy mode of an embodiment of the present invention.
Figure 14:
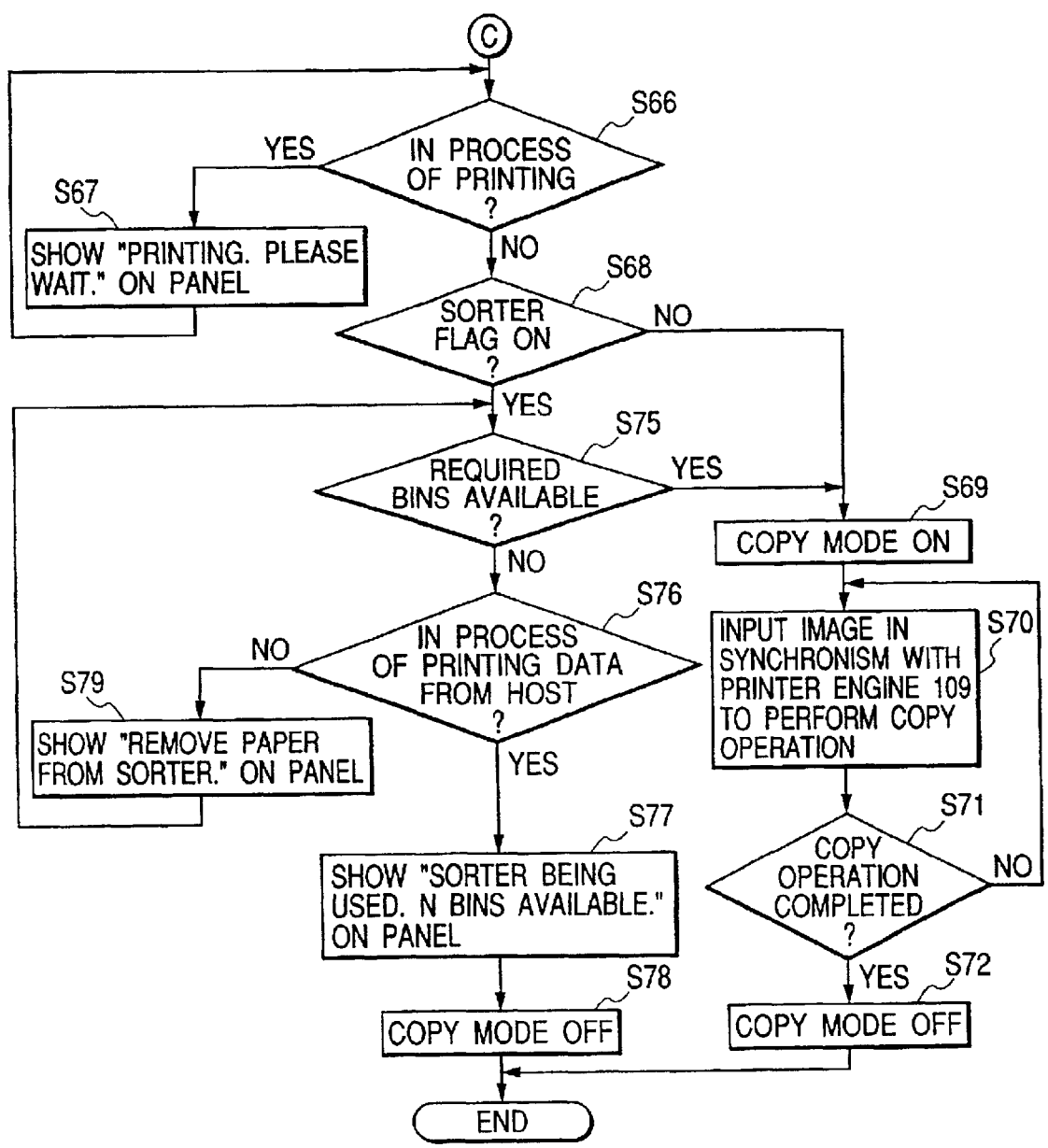

The main controller 150 constantly monitors the input state of the operation panel 102, and, in response to the actuation of any of the buttons thereof, shifts to a process shown in FIG. 13. At first a step S50 discriminates whether the copy button 806 has been depressed, and, if depressed, the sequence proceeds to a step S86 in which the main controller 105 turns on the copy mode flag, thereby declaring the start of a copying operation and proceeds to a copy mode process starting from a step S66 shown in FIG. 14.

On the other hand, if the step S50 identifies that the copy button 806 has not been depressed, the sequence proceeds to a step S51 for discriminating whether the scan start button 804 has been depressed. If depressed, the sequence proceeds to a step S52 for turning on the scan flag and also turning on the LED 805 indicating that the start of scanning is enabled, and the sequence is terminated. Thereafter the input of the image can be started by the transmission of a scan start command from the information processing apparatus, and the sequence shifts to a reading mode process starting from a step S35 in FIG. 7.

On the other hand, if the step S51 identifies that the scan start button 804 has not been depressed, the sequence proceeds to a step S53 for discriminating whether any of the numeral keys (copy number setting buttons) has been depressed. If depressed, the sequence proceeds to a step S54 for setting and storing the copy number according to the depressed buttons and the sequence is terminated.

In case the step S53 identifies that the copy number setting buttons 808 have not been depressed, the sequence proceeds to a step S55 for discriminating whether the sorter button 802 has been depressed. If depressed, the sequence proceeds to a step S60 for discriminating whether the sorter flag, which is turned on when the use of the sorter is designated, is off. If the sorter flag is off, the sequence proceeds to a step S61 for turning on the sorter flag and turning on the LED 803 indicating the sorter mode, thereby informing that the sorter mode is designated, whereupon the sequence is terminated.

On the other hand, if the step S60 identifies that the sorter flag is on, the sequence proceeds to a step S62 for turning off the sorter flag and also turning off the LED 803, thereby informing that the sorter is not used, whereupon the sequence is terminated.

On the other hand, if the step S55 identifies that the sorter button 802 has not been depressed, the sequence proceeds to a step S56 for discriminating whether the reset button 807 has been depressed. If not depressed, there has not been any input from the operation panel 102, so that the sequence is terminated without any action.

On the other hand, if the step S56 identifies that the reset button 807 has been depressed, the sequence proceeds to a step S57 for terminating the copying operation if it is in progress, and returning various parameters and flags, set at the depression of the reset button 807, to the initial state, whereupon the sequence is terminated.

Figure 7:
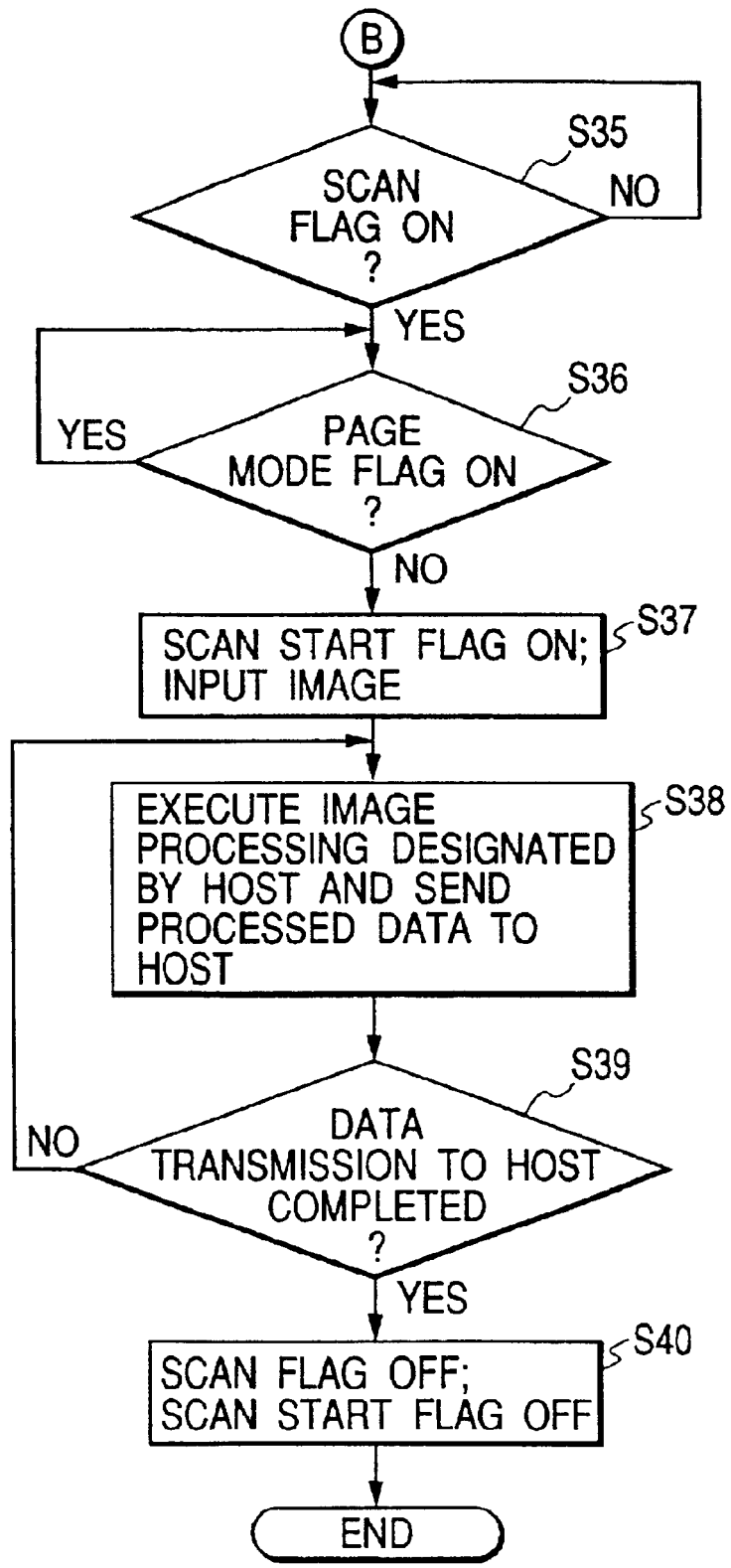
FIG. 7 is a flow chart showing the functions in the read mode of an embodiment of the present invention.

As explained in the foregoing, the main controller 150 discriminates, in the step S1 shown in FIG. 4, whether a scan start command has been received from the information processing apparatus 10, and, if such command is present, the sequence shifts to a process starting from a step S35 in FIG. 7.

In the following there will be explained the scan start commands transmitted from the information processing apparatus 10 with reference to FIG. 15, which shows an example of such commands.

Figure 15:
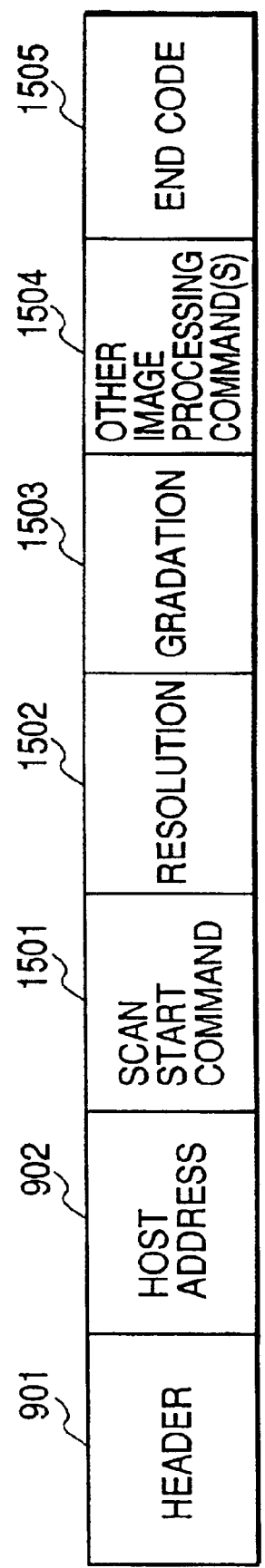
FIG. 15 is a flow chart showing an example of scanner start commands in an embodiment of the present invention.

In FIG. 15, there are shown a header code 901, data 902 showing the network address of the information processing apparatus 10 which transmits the data, a scan start command 1501, resolution designating information 1502, gradation number designating information 1503, other image processing commands 1504 and an end code 1505.

Upon receiving the scan start command from the information processing apparatus 10, the main controller 150 monitors the setting of the scan flag in a step S35 shown in FIG. 7. As explained in the foregoing, when the preparation for original reading is completed in the image input unit 101, the operator depresses the scan button 804 whereby the scan flag is set. In response, the sequence proceeds from the step S35 to S36.

The step S36 discriminates whether the page flag is on. The page mode flag indicates that the bit map terminated.

[Function of the Copy Mode]

The copying operation is started by placing the original to be copied on the original table, designating the number of copies if necessary by the keys 808 of the operation panel 102, also designating the on/off state of the sorter by the sorter switch 802, and finally depressing the copy button 806. In response to the depression of the copy button 806, the main controller 105 shifts from the step S50 shown in FIG. 13 to a step S65 for turning on the copy mode flag, thereby declaring that the copying operation has been started, then to a step S66 for discriminating whether the printer engine 109 is in use or not. If the printer engine 109 is in use, the sequence proceeds to a step S67 for displaying a message "Printing operation in progress, please wait" in the display unit 801 of the operation panel 102. Then sequence returns to the step S66 to wait for the completion of the printing operation of the printer engine 109.

When the printing operation is terminated or if the printer engine is available, the sequence proceeds from the step S66 to S68, in which the main controller 105 discriminates whether the sorter flag is on. As explained in the foregoing, the sorter flag is turned on or off respectively when the use of the sorter 202 is designated or not. Thus, if the sorter flag is off, area 1105 of the RAM 160 is used for printing. If the page mode flag is on, the sequence waits until the page mode flag is turned off, since in this state the image data entered from the image input unit 101 cannot be stored in the RAM 160.

If the step S36 identifies that the page mode flag is off, or has been turned off, the sequence proceeds to a step S37 for turning on the scan start flag and activating the image input unit 101 to start the image input. Then a step S38 executes, in the image processor 103, image processing designated by information 1502–1505 from the information processing apparatus 10, then storing the processed data in the bit map area 1105 of the RAM 160 and transmits the data to the information processing apparatus 10 through the network 50.

Then a step S39 discriminates whether all the data transmission to the information processing apparatus 10 has been completed. If the image input and the transmission of the input image have not all been completed, the sequence returns to the step S38 for continuing the image input and the data transmission to the information processing apparatus 10.

Upon completion of the data transmission to the information processing apparatus 10, the sequence proceeds to a step S40 for turning off the scan flag and the scan start flag, whereupon the sequence is the sequence proceeds to a step S69 for turning on the copy mode, thereby initiating the operation of the copy mode. In this case, the copying operation can be started by interruption, when the current printing operation is completed, even in the course of a printing job for printing the document data transmitted from the information processing apparatus 10.

Thus, a next step S70 activates the image input unit 101 and the printer engine 109, whereby the image data entered from the image input unit 101 are supplied from the image processor 103 to the printer I/F 111 then to the printer engine 109 directly through the local path 112, without going through the system bus 110, and are printed whereby the copying operation is achieved. In this case, the copied sheets are discharged to the sheet discharge unit 204.

Consequently, the image data inputted from the image input unit are not stored in the RAM 160 but are directly sent and printed in the printer engine which functions in synchronization with the image input unit. This operation is same as that in the ordinary digital copier (trade name). Therefore, even during the copying operation, the conversion of the document data, transmitted from the information processing apparatus 10, can be executed in parallel.

Then a step S71 discriminates whether the copying operation has been completed. If not, the sequence returns to the step S70 to continue the above-described copying operation. If the copying operation has been completed, the sequence proceeds to a step S72 to turn off the copy mode, whereby the operation of the copy mode is terminated.

On the other hand, if the step S68 identifies that the sorter flag is on, the sequence proceeds to a step S75 in which the main controller 105 discriminates whether, in the bins 203 of the sorter 202, empty bins are available in the number to be used in the copying operation (namely the number of copies). If the empty bins are available in the sorter 202, the sequence shifts to a process starting from a step S69 and executes the copying operation in a similar manner as when the sorter flag is off. In this case, however, the printed sheets are not discharged to the sheet discharge unit 204 but to the bins 203 of the sorter 202 after sorting.

On the other hand, if the step S75 identifies that the necessary empty bins are not available in the sorter 202, the sequence proceeds to a step S76 in which the main controller 105 discriminates whether a print job for printing the document data transmitted from the information processing apparatus is in progress. If such print job is in progress, the sequence proceeds to a step S77 for displaying a message "Sorter is used; only N bins are available" (N being the number of empty bins) on the display unit 801 of the operation panel 102. Then a step S78 turns off the copy mode and the present sequence is terminated. Thereafter the copying operation can be executed by depressing the reset button of the operation panel 102 and changing the number of copies to the number of empty bins or less, or turning off the sorter.

On the other hand, if the step S76 identifies that the print job is not in progress, the sequence proceeds to a step S79 for displaying a message "Remove sheet from the sorter" on the display unit 801 of the operation panel 102. Then the sequence returns to the step S75 and waits for the elimination of the sheets from the sorter. If no empty bin is available, the copying operation of any condition can only be executed after the current print job is completed and the printed sheets are removed from the sorter bins.

In the foregoing embodiment, the number of copies and the on/off state of the sorter are selected as the conditions of copying, but there may also be selected other conditions. Also the number of empty bins is checked as the printer state, but other states may also be detected for determining whether or not to execute the copying operation.

As explained in the foregoing, the embodiments of the present invention allow to execute multiple functions at the same time, while minimizing the memory capacity thereby suppressing the cost. More specifically:

1) The memory capacity of the RAM 160 can be reduced a capacity enabling the banded printing of the printer engine 109, plus a capacity allowing to store the image input data from the image input unit 101;

2) The ordinary printing operation can be executed by banding, and the image input operation by the scanner can be executed in parallel to the printing operation by such banding; and 3) The operation in the copy mode has priority to other operation, so that the copying function can be achieved as an interruption process even during execution of the print job. In such case, in order to retain the content of the RAM 160, the copying operation is executed by synchronizing the input operation of the scanner with the printing operation for printing the input data.

Based on the foregoing, the simultaneous functions equivalent to those in the prior art can be realized with a memory of 6 Mbytes, consisting of 2 Mbytes for printing and 4 Mbytes for storing the image data inputted from the scanner.

In the foregoing embodiments, there is secured a total memory capacity of 6 Mbytes, consisting of a RAM of 2 Mbytes for the banded printing and a RAM of 4 Mbytes for storing the input image data, but such total memory capacity can naturally be reduced to 4 Mbytes (required for storing the input image data) in case multiple functions need not be executed at the same time.

The present invention may be applied to a system consisting of plural equipment (for example host computer, interface devices, reader, printer etc.) or an apparatus consisting of a single equipment (such as a copying machine or a facsimile apparatus).

Also the objects of the present invention can naturally be attained in a case where a memory medium storing program codes of a software for realizing the functions of the aforementioned embodiments is supplied to a system or an apparatus and a computer (CPU or MPU) in the above-mentioned system or apparatus reads and executes the program codes stored in the memory medium.

In such case the program codes themselves of the software read from the memory medium realize the functions of the aforementioned embodiments, and the memory medium itself storing such program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card or a ROM.

Furthermore, the present invention includes not only the case where the functions of the aforementioned embodiments are realized by the execution of the read program codes by the computer, but also a case where an operating system functioning on the computer executes all the actual processes or a part thereof according to the instruction of such program codes, thereby realizing the functions of the aforementioned embodiments.

The present invention further includes a case wherein the supplied program codes are once stored in a function expansion board of the computer or a memory provided in a function expansion unit connected to the computer, and a CPU or the like provided in the function expansion board or the function expansion unit executes all the process or a part thereof according to the instructions of such program codes, thereby realizing the functions of the aforementioned embodiments.

In case the present invention is applied to the above-described memory medium, program codes corresponding to the foregoing flow charts are stored in such memory medium.

As explained in the foregoing, the present invention can provide a multi function printer capable of simultaneously executing multiple functions while minimizing the required memory capacity, thereby achieving a low cost.

What is claimed is:

1. An apparatus provided with a print function for printing an image specified by print data from an external apparatus and a reading function for reading an original image, said apparatus comprising:

print function realizing means having a first mode which utilizes a banding method and realizes the print function with a smaller memory capacity and a second mode which secures an area for storing bit image data of a page and realizes the print function with a relatively large memory capacity;

discrimination means for discriminating whether the print of the image specified by the print data from the external apparatus is to be realized by the first mode or the second mode; and control means adapted, in a case that said discrimination means judges that the print of the image is to be realized by the first mode, to allow parallel execution of the print function and the reading function, and, in a case that the print of the image is to be realized by the second mode, to inhibit the parallel execution.

2. An apparatus according to claim 1, wherein the banding method is adapted to process the print data from the external apparatus with respect to each band having plural pixel lines, and to extract the processed print data into dot data.

3. An apparatus according to claim 1, wherein said apparatus is further provided with a copy function, and wherein said apparatus further comprises discrimination means adapted, in case of a request for copying in the course of a print job which includes printing of plural pages, to judge whether the print job is to be interrupted based on at least either of a requested copy condition and a status of said apparatus.

4. An apparatus provided with a print function for printing an image specified by print data from an external apparatus and a reading function for reading an original image, comprising:

print function realizing means having a first mode of realizing the print function with a smaller memory capacity and a second mode of realizing the print function with a relatively large memory capacity;

discrimination means for discriminating whether the print of the image specified by the print data from the external apparatus is to be realized by the first mode or the second mode based on the print data from the external apparatus; and control means adapted, in a case that said discrimination means judges that the print of the image is to be realized by the first mode, to allow parallel execution of the print function and the reading function, and, in a case that the print of the image is to be realized by the second mode, to inhibit the parallel execution, wherein said discrimination means is adapted, if the print data of a page from said apparatus cannot be stored in a memory, to judge that the print of the image is to be realized by the second mode.

5. A method for controlling an apparatus provided with a print function for printing an image specified by print data from an external apparatus and a reading function for reading an original image and also having a first mode which utilizes a banding method and realizes the print function with a smaller memory capacity and a second mode which secures an area for storing bit image data of a page and realizes the print function with a relatively large memory capacity, said method comprising:

a discrimination step of discriminating whether the print of the image specified by the print data from the external apparatus is to be realized by the first mode or the second mode; and a control step adapted, if said discrimination step judges that the print of the image is to be realized by the first mode, to allow parallel execution of the print function and the reading function, and, if the print of the image is to be realized by the second mode, to inhibit the parallel execution.

6. A method according to claim 5, wherein the banding method is adapted to process the print data from the external apparatus with respect to each band having plural pixel lines, and to extract the processed print data into dot data.

7. A method according to claim 5, wherein said apparatus additionally has a copying function, and wherein said method further comprises a step of, in a case of a request for copying in the course of a print job which indicates printing of plural pages, judging whether the print job is to be interrupted based on at least either of a requested copy condition and a status of the apparatus.

8. A method for controlling an apparatus provided with a print function for printing an image specified by print data from an external apparatus and a reading function for reading an original image and also having a first mode of realizing the print function with a smaller memory capacity and a second mode of realizing the print function with a relatively large memory capacity, said method comprising:

a discrimination step of discriminating whether the print of the image specified by the print data from the external apparatus is to be realized by the first mode or the second mode based on the print data from the external apparatus; and a control step adapted, if said discrimination step judges that the print of the image is to be realized by the first mode, to allow parallel execution of the print function and the reading function, and, if the print of the image is to be realized by the second mode, to inhibit the parallel execution, wherein said discrimination step is adapted, if the print data of a page from the external apparatus cannot be stored in a memory, to judge that the print of the image is to be realized by the second mode.

9. An apparatus provided with a copy function for printing an original image read by reader means and a printing function for printing an image specified by print data from an external apparatus and which includes plural sheet discharge means, said apparatus comprising:

discrimination means adapted, in a case of a request for copying in the course of a print job which includes printing of plural pages, to judge whether the print job is to be interrupted based on at least either of a requested copy condition and the number of the sheet discharge means available for the copying operation; and control means adapted, if said discrimination means judges that the print job is to be interrupted, to interrupt the print job and to execute the requested copying operation.

10. An apparatus according to claim 9, wherein said apparatus also has a function for sorting the printed sheets, and wherein said discrimination means includes means for discriminating whether the print job is to be interrupted or not based on whether the requested copy condition utilizes the sorting function.

11. An apparatus according to claim 9, further comprising generation means for generating bit image data based on the print data from the external apparatus, wherein said generation means is adapted, if said control means interrupts the print job and executes the requested copying operation, to execute generation of the bit image data parallel to the copying operation.

12. An apparatus according to claim 9, further comprising a unit that is adapted, if the print job is interrupted and the requested copying operation is executed, to re-start the interrupted print job after the completion of the copying operation.

13. A method for controlling an apparatus provided with a copy function for printing an original image read by reader means and a printing function for printing an image specified by print data from an external apparatus and which includes plural sheet discharge means, said method comprising:

a discrimination step of, in case of a request for copying in the course of a print job which includes printing of plural pages, judging whether the print job is to be interrupted based on at least either of a requested copy condition and the number of the sheet discharge means required by the requested copy condition; and a control step of, if it is judged in said discrimination step that the print job is to be interrupted, interrupting the print job and executing the requested copying operation.

14. A method according to claim 13, wherein the apparatus further is provided with a function for sorting the printed sheets, and wherein said discrimination step includes a step of discriminating whether the print job is to be interrupted or not based on whether the requested copy condition utilizes the sorting function.

15. A method according to claim 13, further comprising a generation step of generating bit image data based on the print data from the external apparatus, wherein said generation step includes, if in said control step the print job is interrupted and the requested copying operation is executed, executing generation of the bit image data parallel to the copying operation.

16. A method according to claim 13, further comprising a step of, if the print job is interrupted and the requested copying operation is executed, re-starting the interrupted print job after the completion of the copying operation.

* * * * *

UNITED STATES PATENT AND TRADEMARK OFFICE
CERTIFICATE OF CORRECTION

| | | |
|---|---|---|
| PATENT NO. | : 6,947,166 B2 | |
| APPLICATION NO. | : 09/985710 | |
| DATED | : September 20, 2005 | |
| INVENTOR(S) | : Shigeru Ueda | |

It is certified that error appears in the above-identified patent and that said Letters Patent is hereby corrected as shown below:

COLUMN 2
Line 14, "made" should read --make--.

COLUMN 5
Line 35, "ling" should read --line--.

COLUMN 7
Line 13, "of,a" should read --of a--.
Line 51, "on, flag" should read --on, indicating that a copying operation is in progress, the sequence returns to the step S20.
      On the other hand, if the step S21 identifies that the copy mode flag is off or has been turned off, the sequence proceeds to a step S22 to display a message "remove sheets from the sorter" in the display unit 801 of the operational panel 102, and the sequence returns to the step S20 to await the elimination of the sheets from the sorter unit.
      On the other hand, if the step S20 identifies the use of the sorter and that the bins of the necessary number are empty in the sorter at the printing, or identifies that the sorter is not used, the sequence proceeds to a step S25, in which the main controller 105 discriminates whether the copy mode flag is on. The copy mode flag is turned on when the copying operation is in progress, so that, if the printer engine 109 is in use and the copy mode flag is on, the sequence waits until the copy mode flag is turned off.
      When the copy mode flag is turned off, the sequence proceeds to a step S26 for discriminating whether a scan start flag is on. As will be explained later, the scan start flag is set in case of the image input operation from the image input unit, and is turned on when the image input unit 101 completes the preparation for reading and

UNITED STATES PATENT AND TRADEMARK OFFICE
CERTIFICATE OF CORRECTION

| | |
|---|---|
| PATENT NO. | : 6,947,166 B2 |
| APPLICATION NO. | : 09/985710 |
| DATED | : September 20, 2005 |
| INVENTOR(S) | : Shigeru Ueda |

It is certified that error appears in the above-identified patent and that said Letters Patent is hereby corrected as shown below:

COLUMN 7 (Cont'd)
starts the image reading operation. The steps S26 monitors that the scan start flag--.

Signed and Sealed this

Twenty-fourth Day of October, 2006

JON W. DUDAS
*Director of the United States Patent and Trademark Office*